(12) United States Patent
Waltz

(10) Patent No.: US 10,515,326 B2
(45) Date of Patent: Dec. 24, 2019

(54) DATABASE SYSTEMS AND RELATED QUEUE MANAGEMENT METHODS

(71) Applicant: salesforce.com, inc., San Francisco, CA (US)

(72) Inventor: D. Thomas Waltz, Carmel, IN (US)

(73) Assignee: ExactTarget, Inc., Indianapolis, IN (US)

(*) Notice: Subject to any disclaimer, the term of this patent is extended or adjusted under 35 U.S.C. 154(b) by 898 days.

(21) Appl. No.: 14/839,078

(22) Filed: Aug. 28, 2015

(65) Prior Publication Data
US 2017/0061364 A1 Mar. 2, 2017

(51) Int. Cl.
*G06F 17/30* (2006.01)
*G06Q 10/06* (2012.01)
*G06F 16/2453* (2019.01)

(52) U.S. Cl.
CPC . *G06Q 10/063118* (2013.01); *G06F 16/2453* (2019.01)

(58) Field of Classification Search
CPC ......... G06F 17/30008; G06F 17/30283; G06F 17/30337; G06F 17/30525; G06F 9/3851; G06F 9/46; G06F 9/4831; G06F 3/0659; G06Q 16/06316; H04L 49/90
USPC .................................................. 707/799, 764
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,916,307 A * | 6/1999 | Piskiel ............ | G06F 9/546 718/101 |
| 5,918,159 A | 6/1999 | Fomukong et al. | |
| 5,963,953 A | 10/1999 | Cram et al. | |
| 6,058,389 A * | 5/2000 | Chandra .......... | G06F 9/546 |
| 6,092,083 A | 7/2000 | Brodersen et al. | |

(Continued)

OTHER PUBLICATIONS

Oracle 9i Application Developer's Guide—Advanced Queuing Release 2 (9.2) Mar. 2002.*

*Primary Examiner* — Jean M Corrielus
(74) *Attorney, Agent, or Firm* — Lorenz & Kopf, LLP

(57) ABSTRACT

Systems and methods are provided for processing queues in a database system. An exemplary system includes a database having a plurality of queue tables, with each queue table being associated with a different queue type and having a different schema associated therewith. A server coupled to the database determines a number of threads to allocate to a particular queue based at least in part on a number of entries in a queue table and configuration information associated with the queue and allocates that number of threads to the queue. Each thread causes a processing system of the server to retrieve work detail data for a respective subset of entries of the queue of entries from that queue table in a manner that is influenced by schema associated with that queue table and then perform a task corresponding to the queue type using the work detail data.

8 Claims, 5 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,738,646 B2 * | 5/2014 | Jasik | H04L 51/02 707/769 |
| 8,763,012 B2 * | 6/2014 | Hosie | G06F 9/52 709/206 |
| 8,769,550 B1 * | 7/2014 | Leonard | G06F 9/505 718/102 |
| 8,793,691 B2 * | 7/2014 | Devadhar | G06F 9/546 707/E17.001 |
| 10,013,294 B2 * | 7/2018 | Kwong | G06F 9/546 |
| 10,169,090 B2 * | 1/2019 | Wang | G06F 16/285 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0083572 A1 * | 4/2007 | Bland | G06F 17/30563 |
| 2007/0143353 A1 * | 6/2007 | Chen | G06F 12/0292 |
| 2008/0249972 A1 | 10/2008 | Dillon | |
| 2008/0263106 A1 * | 10/2008 | Asherman | G06F 17/30578 |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0110568 A1 * | 5/2011 | Vesper | G06F 19/321 382/128 |
| 2011/0247051 A1 | 10/2011 | Bulumulla et al. | |
| 2011/0258628 A1 * | 10/2011 | Devadhar | G06F 9/546 718/100 |
| 2012/0042218 A1 | 2/2012 | Cinarkaya et al. | |
| 2012/0070045 A1 * | 3/2012 | Vesper | G06Q 50/22 382/128 |
| 2012/0218958 A1 | 8/2012 | Rangaiah | |
| 2012/0233137 A1 | 9/2012 | Jakobson et al. | |
| 2012/0254221 A1 * | 10/2012 | Lai | G06F 16/2358 707/769 |

(56) References Cited

U.S. PATENT DOCUMENTS

| | | |
|---|---|---|
| 2013/0061229 A1* | 3/2013 | Hamada .................... G06F 9/46 |
| | | 718/100 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0108443 A1 | 4/2014 | Ciancio-Bunch et al. |
| 2014/0173012 A1 | 6/2014 | Ciancio-Bunch et al. |
| 2014/0372702 A1* | 12/2014 | Subramanyam .... G06F 12/0848 |
| | | 711/129 |
| 2015/0100604 A1 | 9/2015 | Ciancio-Bunch et al. |
| 2016/0119246 A1* | 4/2016 | Wang ...................... H04L 47/72 |
| | | 709/226 |
| 2017/0061364 A1* | 3/2017 | Waltz ................. G06F 16/2453 |

* cited by examiner

DATABASE SYSTEMS AND RELATED QUEUE MANAGEMENT METHODS

TECHNICAL FIELD

Embodiments of the subject matter described herein relate generally to computer systems, and more particularly, to methods and systems for managing queues in an on-demand database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

One drawback associated with an on-demand multi-tenant system is the difficulty managing queues involving a relatively large number of tasks or large amounts of data across various tenants. For example, system performance may also suffer as the volume of queues increases. At the same time, the complexity of prioritizing, scheduling, and segmenting queues increases as the number of queues increases. Accordingly, it is desirable to provide a system capable of managing queues in an efficient and flexible manner.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
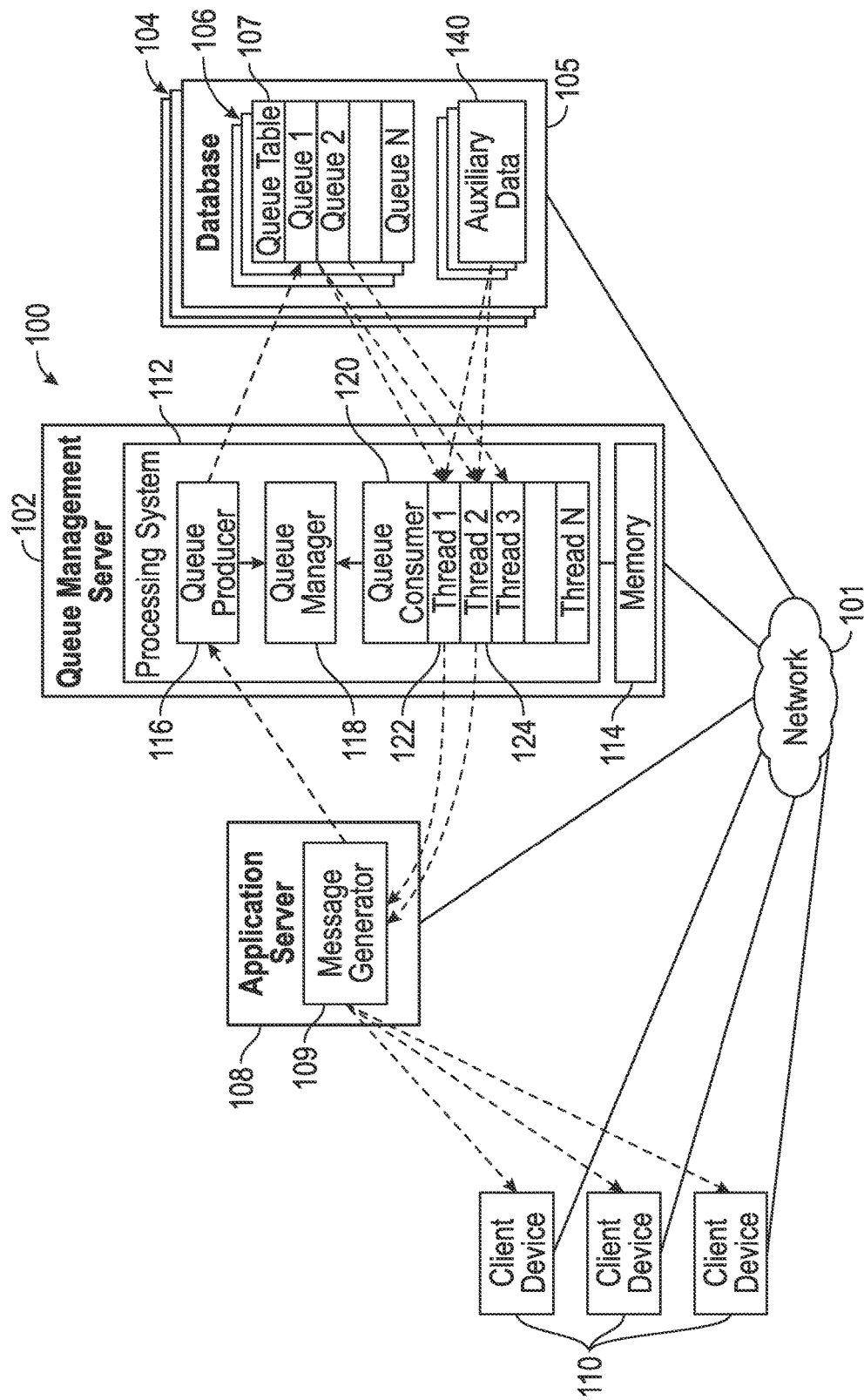
FIG. 1 is a block diagram of an exemplary on-demand database system.

Embodiments of the subject matter described herein generally relate to database computer systems and related methods that support flexible and efficient queue management. In exemplary embodiments, a database that is utilized to support queue handling or processing includes a number of queue tables that correspond to a number of different queue types supported by that respective database, along with one or more auxiliary data tables that include data referenced by or otherwise pertaining to one or more queues maintained in the queue tables. Each queue table is associated with a different queue type, and each queue table has different schema associated therewith. Thus, while the queue tables may share a number of common fields or columns, each queue table has structural differences relative to the other queue tables maintained by the respective database, such as, for example, one or more unique fields or columns, one or more fields or columns that reference different or unique tables of the database, or the like. The queue type also dictates whether or not the queue can be segmented, with one or more fields or columns of a respective queue table being utilized to support segmenting the queue and ordering that queue's entries. As described in greater detail below, a segmented queue may have its own set of dedicated threads so that accumulated entries for one segment do not delay or prevent processing entries of another segment. Each queue type may also correspond to a different type of database transaction, and the queue table schema may be chosen or otherwise designed for that particular type of database transaction. Thus, by allocating different queue types to different database tables, processing entries of a respective queue can be tailored for that particular type of database transaction using work detail data or other configuration information associated with that queue's entries in conjunction with the auxiliary data tables maintained by the database. Additionally, as described in greater detail below, some embodiments include multiple different databases with different database types associated therewith, thereby allowing the processing entries of a respective queue to be improved by ensuring the auxiliary data utilized by a queue maintained in the queue tables of a respective database will more than likely already be maintained in auxiliary data tables of that particular database.

The queue management system identifies a queue of entries in one of the queue tables and determines when to begin processing the queue and the number of processing threads to be allocated to that queue based at least in part on a configuration information associated with the queue. Thus, queues can be prioritized and scheduled relative to one another, and entries of a particular queue can be processed in parallel according to the number of allocated threads. As described below, each thread corresponds to a set of programming instructions that are dynamically created at run-time based on the queue configuration information, which are subsequently loaded or fetched and then executed by a processing system of a server. For purposes of explanation, the subject matter is described herein in the context of threads of an individual queue management server being allocated to a particular queue. However, in practice, processing of a particular queue may be distributed across a plurality of servers, where each of those servers has one or more threads allocated to the queue.

As described in greater detail below, each allocated processing thread on a server retrieves a particular number of entries of the queue from the database, and for each of those entries, retrieves corresponding data from an auxiliary data table in the database in a manner that is influenced by the queue type (e.g., based on the configuration data associated with those entries). For example, for entries associated with a first queue, the queue management server may automatically determine a number of threads to be allocated to the first queue based on the total number of entries and a priority criterion associated with the first queue, and then automatically allocate and initiate those threads to processing entries of the first queue. Each thread causes a processing system of the queue management server to retrieve work detail data for a respective subset of entries of the first queue from its associated queue table using the table schema associated with that queue table to identify the appropriate fields of work detail data for the particular database transaction or task type associated with first queue. Each thread then causes the processing system to perform the particular database or task associated with the first queue using those fields of work detail data for that subset of entries. In one or more embodiments, performance of the particular database or task on or using the work detail data generates result data, which, in turn, is transmitted or otherwise provided to another computing device on a network associated with the first queue (e.g., the originating device for the first queue and/or its entries).

FIG. 1 depicts an exemplary embodiment of an on-demand database system 100 that includes a server 102 that manages creation and execution of queues maintained in databases 104 coupled thereto. Accordingly, the queue management server 102 may alternatively be referred to herein as a queue management server. Exemplary embodiments of the on-demand system 100 include a plurality of different types of databases 104, with entries associated with a particular queue being stored or otherwise maintained a particular database of the type that is likely to be most efficient for that particular queue. Additionally, in exemplary embodiments, each database 104 includes a plurality of queue tables 106 corresponding to different queue types, with entries associated with a particular queue being stored or otherwise maintained in the particular queue table 106 corresponding to the queue type that is likely to be most efficient for that particular queue.

In the illustrated embodiment, the queue management server 102 receives or otherwise obtains configuration information defining a particular queue for execution from another computing device, such as an application server 108, which is coupled to the queue management server 102 via a communications network 101, such as a wired and/or wireless computer network, the Internet, a cellular network, a mobile broadband network, a radio network, or the like. The illustrated application server 108 includes or otherwise implements an application platform that generates a message generation application 109 (or message generator) that provides queue information (e.g., queue configuration information and work detail data for queue entries) to the queue management server 102 over the network 101 and receives, from the queue management server 102 via the network 101, result data that is retrieved from a database 104 or otherwise generated in response to the queue management server 102 processing entries of the queue. The queue result data may be utilized by the message generator 109 to generate or otherwise provide a message, notification, or other indication that is provided, via the network 101, to one or more client electronic devices 110 (e.g., any sort of personal computer, mobile telephone, tablet or other network-enabled electronic device that includes user input/output devices). For example, the queue information may include information identifying intended recipients for a message (e.g., an e-mail, a text message, or the like), with the result data from the queue management server 102 including data or information associated with each of the intended recipients, which, in turn, is utilized by the message generator 109 to personalize the message for each particular recipient before pushing or otherwise sending the personalized messages to the intended recipients via the network 101.

As described in greater detail below in the context of FIGS. 2-3, in exemplary embodiments, a user of a client device 110 may manipulate a client application executing thereon (e.g., a web browser or the like) to access the application server 108, which, in turn, generates an instance of a virtual application provided to the client device 110 at run-time (or "on-demand") based in part upon code, data, and/or other information stored or otherwise maintained by the queue management server 102 and/or a database 104 (e.g., information identifying available database types, supported queue types, and the like). The virtual application provides a graphical user interface (GUI) (e.g., GUI display 300 of FIG. 3) which allows the user of the client device 110 to interact with the message generator 109 to create or otherwise define configuration information for a queue to be executed, implemented, or otherwise supported by the queue management server 102. For example, the user may select or otherwise indicate a particular database (or database type) of the plurality of databases 104 (or database types) that the user would like to store or otherwise maintain the queue, the particular queue table (or queue type) of the plurality of queue tables 106 (or queue types) that the user would like to store or otherwise maintain the queue entries (i.e., the queue type the user would like to assign the queue), a level of priority (or priority criterion) the user would like to assign to the queue, and other configuration information or metadata defining the queue to be created. The queue configuration information may be utilized to configure the message generator 109 for automatically generating or creating queue entries for the queue, which are provided to the queue management server 102 for management and execution in accordance with the queue configuration information, as described in greater detail below.

Still referring to FIG. 1, the queue management server 102 generally represents a computing system or another combination of processing logic, circuitry, hardware, and/or other components configured to support the processes, tasks, operations, and/or functions described herein. In this regard, the queue management server 102 includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system 112 described herein. The processing system 112 may include or otherwise access a data storage element 114 (or memory) capable of storing programming instructions for execution by the processing system 112, that, when read and executed, cause processing system 112 to create, generate, or otherwise facilitate one or more applications 116, 118, 120 configured to manage queues in the databases 104. Depending on the embodiment, the memory 114 may be realized as a random access memory (RAM), read only memory (ROM), flash memory, magnetic or optical mass storage, or any other suitable non-transitory short or long term data storage or other computer-readable media, and/or any suitable combination thereof.

In the illustrated embodiment, a queue producer application 116 executing on the processing system 112 receives, from the message generator 109, queue configuration information and utilizes the queue configuration information to create or otherwise instantiate a queue having the indicated queue type in the desired database of the plurality of databases 104, as described in greater detail below in the context of FIGS. 2-3. In this regard, the queue producer 116 manages the writing or storing of entries associated with a particular queue to the queue table 107 corresponding to the selected queue type for the queue within the selected database 105 for the queue. Additionally, in some embodiments, the queue producer 116 may also store or otherwise receive auxiliary data or information for a particular queue to one or more auxiliary database tables 140 in the selected database 105. After creating a queue, the queue producer 116 notifies a queue management application 118 (or queue manager), which, in turn, monitors or otherwise tracks the active queues within the on-demand system 100 and interacts with a queue consumer application 120 to manage the allocation of computing resources of the processing system 112 to a particular queue, as described in greater detail below in the context of FIG. 4. In this regard, the queue manager 118 and the queue consumer 120 are cooperatively configured to prioritize and segment processing of queues in a manner that achieves a desired allocation of computing resources.

Figure 2:
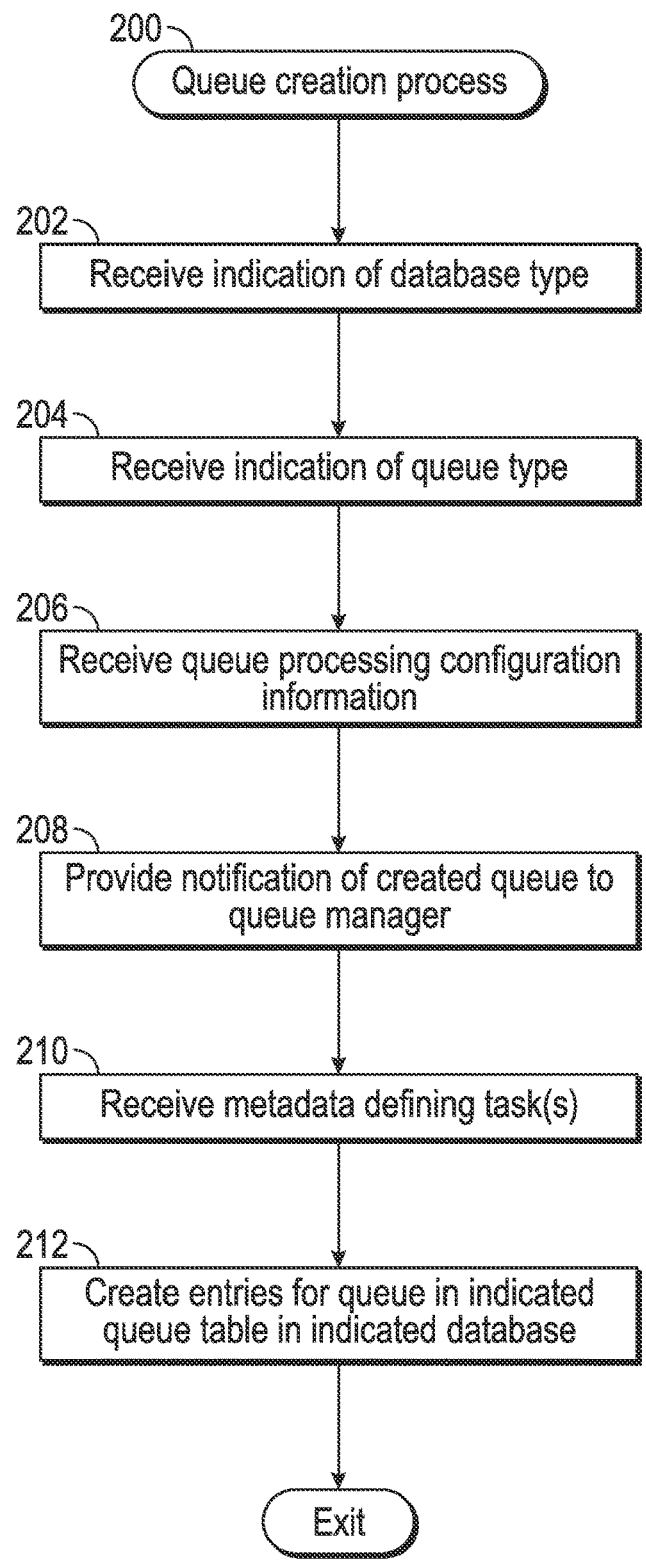
FIG. 2 is a flow diagram of an exemplary queue creation process suitable for implementation by the on-demand database system of FIG. 1 in accordance with one or more embodiments.

FIG. 2 depicts an exemplary embodiment of a queue creation process 200 suitable for implementation by a queue management server to create or otherwise instantiate queues in a database in an on-demand database system. For illustrative purposes, the following description may refer to elements mentioned above in connection with FIG. 1. In practice, portions of the queue creation process 200 may be performed by different elements of the on-demand database system 100, such as, for example, the queue management server 102, the database 104, the processing system 112, the queue producer 116, and/or the queue manager 118. It should be appreciated that the queue creation process 200 may include any number of additional or alternative tasks, the tasks need not be performed in the illustrated order and/or the tasks may be performed concurrently, and/or the queue creation process 200 may be incorporated into a more comprehensive procedure or process having additional functionality not described in detail herein. Moreover, one or more of the tasks shown and described in the context of FIG. 2 could be omitted from a practical embodiment of the queue creation process 200 as long as the intended overall functionality remains intact.

Referring to FIG. 2 with continued reference to FIG. 1, in exemplary embodiments, the queue creation process 200 begins by identifying or otherwise receiving indication of a desired database type of a plurality available database types for the new queue to be created (task 202). In this regard, the entries associated with the queue are stored or otherwise maintained in the particular database 105 where execution of the queue task on those entries is likely to be most efficient. The selected database 105 may be identified using metadata associated with each entry of the queue received by the queue management server 102 over the network 101, which, in turn, is referenced or otherwise utilized by the queue producer 116 to store the entries in the appropriate database 105.

Referring again to FIG. 1, the illustrated system 100 includes a plurality of different databases 104 having a different database type associated therewith, such as, a client database, a system database, a statistics database, a transient database, a miscellaneous database, or the like. For example, a client database may store contact database objects or other data or information pertaining to clients, business contacts or the like associated with the various tenants or uses supported by the on-demand system 100. A system database may store data that maps accounts to their respective host client databases within the on-demand system 100 along with system level settings and data (e.g., definitions of application server farms and the like). A statistics databases may contain detail and aggregate event level data pertaining to messages (e.g., sent messages, opened messages, acted upon messages, hyperlinks clicked within messages, or the like), which, in turn, may be utilized for reports, extracts, audience segmentation, and the like. It should be appreciated that the foregoing are merely provided as non-limiting examples of database types, and numerous other database types may be present in a given implementation of the on-demand system 100 (e.g., a transient data database, a message database, a link database, an application programming interface (API) database, an error log database, an authorization database, and/or the like).

Based on the type of task being queued, the creator of the queue selects or otherwise identifies the database type that is most appropriate for the task. For example, if the queued task involves retrieving destination address or other contact information for sending a message to a number of clients or subscriber, the contacts database 105 may be selected from among the plurality of databases 104 as the database that is most likely to include the relevant information for the task. Similarly, if queued task involves queued task involves consuming API request, the API database 105 may be selected from among the plurality of databases 104 as the destination database for the queue entries, if the queued task involves delivering rendered messages, the message database 105 may be selected from among the plurality of databases 104 as the destination database for those queue entries, and so on.

As described in greater detail below in the context of FIG. 5, in one or more exemplary embodiments, one or more of the databases 104 is realized as multi-tenant database that is shared between multiple tenants. In such embodiments, each tenant has its own set of associated users and its own associated data that is logically separate or otherwise isolated from data belonging to other tenants. In this regard, each of the databases 104 stores or otherwise maintains data associated with a number of different tenants and restricts each tenant's access to other tenants' data (or alternatively, restricts accessibility of each tenant's data with respect to other tenants). Thus, in exemplary embodiments, one or more unique tenant identifiers are associated with each entry of the queue to ensure the queued task is only executed on data associated with (or accessible to) the tenant who created the queue.

Referring again to FIG. 2, the queue creation process 200 also identifies or otherwise receives indication of a desired queue type of a plurality available queue types for the new queue to be created (task 204). In this regard, the entries associated with the queue are stored or otherwise maintained in a particular queue table 107 of a plurality of potential queue tables 106 maintained by the selected database 105 that corresponds to the particular type of task associated with the queue being created. For example, each of the queue tables 106 may be associated with a particular type of task, with the columns of the queue table 106 corresponding to the fields of metadata necessary for performing that task. In other words, the number of columns supported by a particular queue table 106 may be dictated or otherwise optimized according to the particular task associated with that queue table 106, thereby improving the efficiency of performing that task. For example, a first queue table 106 may be associated with a first task type (e.g., an import operation to import data to the selected database 105), a second queue table 106 may be associated with a second task type (e.g., an export operation to export data from the selected database 105), a third queue table 106 may be associated with a third task type (e.g., e-mail send), a fourth queue table 106 may be associated with a fourth task type (e.g., text message send), and the like. Each queue table 106 is also structured in accordance with table schema that is unique to the particular task type associated therewith. In exemplary embodiments described herein, each queue table 106 includes a column or field corresponding to a priority associated with the particular queue, thereby allowing processing of entries of one queue to be prioritized relative to those of another queue based on the relative priorities, as described in greater detail below in the context of FIG. 4. Additionally, each queue table 106 includes a column or field corresponding to a unique identifier associated with the particular queue, thereby allowing entries associated with the queue to be identified or otherwise distinguished relative to other entries in the selected queue table 107.

The queue creation process 200 also identifies or otherwise receives queue processing configuration information for the new queue to be created (task 206). In exemplary embodiments, the queue processing configuration information includes a priority level to be assigned to the queue along with thread allocation information for allocating available threads of the processing system 112 to performing the tasks associated with the queue. In this regard, the thread allocation information influences the amount of computing resources that are allocated to processing entries associated with the queue, while the priority information influences the temporal performance of those threads. For example, a high priority queue may have threads allocated to it substantially immediately upon creation (e.g., on the order of seconds) so that queue entries are processed by those allocated threads with minimal delay. A normal priority queue may have threads allocated to it with some delay after creation (e.g., on the order of a few minutes), which allows resources to be preserved for higher priority queues or active queues during that interval of time (e.g., 1-2 minutes) between queue creation and thread allocation. Conversely, a low priority queue may have threads allocated to it in an even more delayed manner, so that the interval of time between queue creation and thread allocation is even greater.

The thread allocation information may include or otherwise delineate a requested number of threads to be allocated to the queue, a maximum allowable number of threads that can be allocated to the queue, a minimum allowable number of threads that can be allocated to the queue, and the like. In one or more embodiments, the thread allocation information also includes a timeout period for releasing threads allocated to the queue. Alternatively or in the absence of the thread allocation information specifying the timeout period, the timeout period may be determined based on the priority associated with the queue, and in some embodiments, may be dynamically determined based on the current allocation of resources of the processing system 112 across multiple active queues. The thread allocation information may also specify the number of queue entries to be fetched by a particular thread for each instance of that thread accessing the database 104, along with providing an indication of whether or not background threads are allocated and allowed to prefetch queue entries from the database 104.

In one or more embodiments, the queue processing configuration information also includes an indication of whether or not one or more fields of the queue entries will include a pointer to an auxiliary data table 140 in the database 104. For example, in some embodiments, the data for performing queued tasks may reside at a known location in the database 104, in which case the queue processing configuration information may indicate that those fields of the queue table 107 corresponding to that data will include a pointer to the location of the actual data values in an auxiliary data table 140 rather than the actual data values. Additionally, the queue processing configuration information may also identify or otherwise indicate whether custom fields or columns are to be added to the queue table 107 for the queue. Since queue performance and scale can be adversely affected by including large chunks of data on the queue, the custom fields or columns along with the auxiliary data tables 140 can be utilized to keep the queue tables 106 narrow and efficient. For example, if an API call requesting the delivery of a message to a recipient included the body of the message to be delivered, the message body could be quite large, in which case, the user defining the queue might choose to store the message body in one of the auxiliary data tables 140 rather than the queue table 107.

After the desired database type, queue type, and queue processing configuration information for the new queue to be created have been defined, the queue creation process 200 generates or otherwise provides a notification of the new queue being created within a database of the on-demand system (task 208). In this regard, after receiving indication of the database type, queue type, queue priority, thread allocation information, and the like, the queue producer 116 generates or otherwise provides a notification to the queue manager 118 that indicates a new queue has been created for execution by the queue management server 102. The notification may also include the unique identifier associated with the queue and the priority associated with the queue, along with the identifiers corresponding to the destination database 105 and the destination table 107 for the queue. Based on the notification, the queue manager 118 allocates one or more processing threads associated with the queue consumer 120 to the newly-created queue and initiates processing of the queued task on the entries associated with newly-created queue according to the priority and thread allocation information associated with the queue, as described in greater detail below in the context of FIG. 4.

Figure 3:
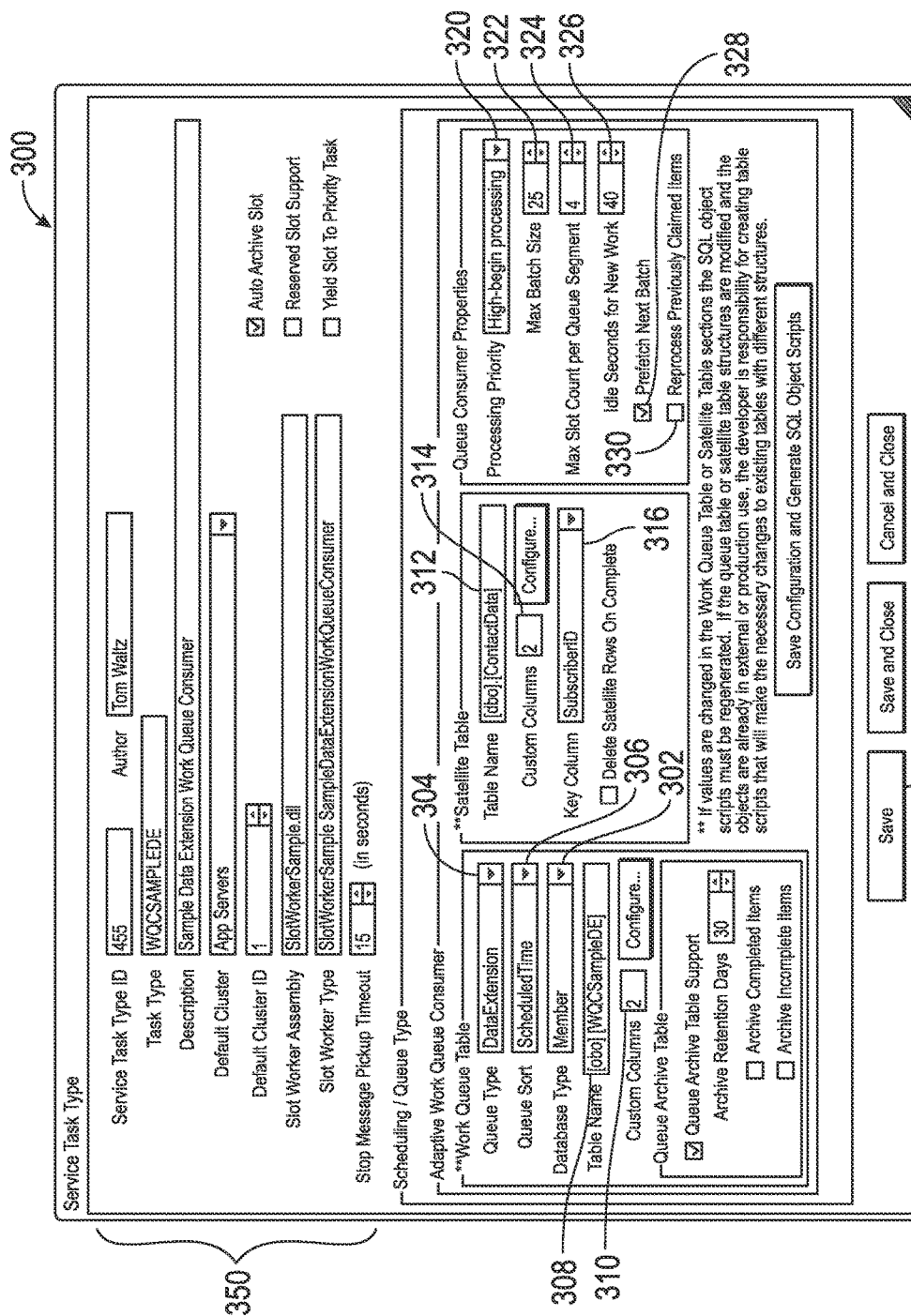
FIG. 3 illustrates an exemplary graphical user interface display that may be presented on a client device in the on-demand database system of FIG. 1 in connection with the queue creation process of FIG. 2 in accordance with one or more exemplary embodiments.

FIG. 3 depicts a graphical user interface (GUI) display 300 that may be presented by an application server (e.g., by application server 108) on a client device 110 in conjunction with the queue creation process 200 to create a new queue within the on-demand system 100. For example, the message generator 109 may generate or otherwise provide the GUI display 300 within a virtual application provided on a client device 110 via the network 101. The GUI display 300 includes a GUI element 302, such as a drop-down or pull-down menu, a list box, or the like, that allows the user to select, identify, or otherwise indicate a desired destination database (or database type) from among a plurality of available databases (or database types). The GUI display 300 also includes a GUI element 304 (e.g., another drop-down menu, list box, or the like) that allows the user to select, identify, or otherwise indicate the schema or other characteristics of a queue table to be created (e.g., one more required columns and indexes) to be generated with the name indicated by GUI element 308, thereby instantiating a desired queue table (or queue type) among a plurality of queue tables (or queue types) that are supported. Another GUI element 306 may be manipulated by the user to indicate or otherwise define how queue entries are to be sorted before retrieval (e.g., first in first out, a scheduled time order, or the like), and an additional GUI element 310 allows the user to add additional custom columns or fields to the queue table (e.g., via a different GUI display).

Another GUI element 312 allows the user to select or otherwise identify an auxiliary data table 312 (or satellite table) that stores or maintains data pertaining to the queued task, along with a first GUI element 314 that indicates the number of custom columns associated with that user or tenant which are implemented by the selected auxiliary data table and allows the user to add additional custom columns or fields to the selected auxiliary data table (e.g., again via a different GUI display). Another GUI element 316 allows the user to select, identify, or otherwise indicate a key column from among the custom column(s) associated with the user or tenant, which, in turn, indicates the column of the selected auxiliary data table that ties one or more rows of the auxiliary data table to a corresponding row in the indicated queue table. A column of this name and type will be automatically added to the queue table, which, in turn, will be utilized by the queue consumer 120 to fetch the auxiliary data corresponding to a particular queue entry (or queue row) when that entry is claimed or otherwise passed to the queue consumer 120.

The GUI display 300 also includes a plurality of GUI elements that allow the user to input or otherwise define various queue processing configuration information for the queue. For example, a menu or list GUI element 320 allows the user to select, identify, or otherwise indicate a priority that the user would like to associate with the queue. Additionally, the illustrated GUI display 300 includes a GUI element 322 that allows the user to specify the maximum number of queue entries to be retrieved from the database for each instance of an allocated thread retrieving queue entried from the database, another GUI element 324 that allows the user to specify the maximum number of threads that the user would like to be allocated to the queue, and a GUI element 326 that specifies an idle timeout period before releasing a thread from the queue. Some embodiments of the GUI display 300 also include a GUI element 328 that allows a user to specify whether background threads are allowed to prefetch queue entries in the background along with a GUI element 330 that allows the user to specify the management of queue entries that have been claimed or retrieved by a queue consumer thread but not completed due to an anomalous condition with respect to the server 102, the network 101, the database 105, or the like that interrupts processing of those entries. If GUI element 330 is checked, upon recovery, the queue entry will be reclaimed with a flag informing the queue consumer 120 that the queue entry was previously claimed for processing in case there are any additional data clean steps required. Otherwise, if unchecked, the queue entry will be removed from the queue and logged or archived as desired.

In exemplary embodiments, the GUI display 300 also includes a selectable GUI element 340 (e.g., a button or the like) that allows the user to save or otherwise persist the queue within the on-demand system. In this regard, after the user has defined the queue to be created, the user may select the button 340, and in response, the selected database type, the selected queue type, and the associated queue processing configuration information are transmitted or otherwise provided to the queue producer 116 via the network 101, which, in turn, creates or otherwise establishes support for the corresponding queue in the on-demand system 100 and provides the notification of created queue to the queue manager 118. In exemplary embodiments, the queue manager 118 maintains a list of queues that are actively being supported by the on-demand system 100. Thereafter, as the queue producer 116 places work on a queue (e.g., by writing entries to the appropriate queue table 107 in the appropriate database 105), the queue producer 116 notifies the queue manager 118, which, in turn, communicates with the queue consumer 120 and coordinates the allocation and instantiation of threads to those queue entries, as described below. Depending on the embodiment, the queue manager 118 may maintain the list of active queues locally in memory 114 or remotely in a table of a database 104. The illustrated GUI display 300 also includes a region 350 including GUI elements adapted to allow the user to identify the code (and/or its location thereof within the on-demand system 100) that is to be instantiated by an allocated thread to perform the queue specific processing (i.e., the task corresponding to the queue type using the work detail data) for the entries of the queue defined below. The queue manager 118 may also maintain an association between each active queue and its corresponding setup code for thread instantiation, as described in greater detail below.

Referring again to FIG. 2, the queue creation process 200 receives or otherwise obtains metadata defining the individual tasks to be performed and creates or otherwise instantiates the corresponding entries for the queue in the queue table corresponding to the indicated queue type in the database corresponding to the indicated database type (task 208, 210). In this regard, the queue management server 102 and/or the queue producer 116 receives, via the network 101 from the application server 108 and/or the message generator 109, metadata corresponding to the columns (or fields) of the selected queue table 107 which informs the queue consumer 120 of the details of the particular task or transaction to be performed for a particular row or entry of the queue table 107. Accordingly, the metadata may alternatively be referred to herein as the work detail data (or work detail metadata) for a particular queue entry. In practice, the received metadata may be delimited to define the respective entries of the queue (i.e., the respective instances of the queued task to be performed) along with the respective columns or fields of the selected queue table 107. The metadata for each entry may also include one or more unique identifiers associated with a particular tenant responsible for creating the queue (e.g., the tenant associated with the application server 108), along with the unique identifiers corresponding to the selected database 105 and the selected queue table 107 providing the destination for where the respective entry is to be stored and an indication of the relative priority for the queue. For each delimited instance of metadata received from the application server 108 and/or the message generator 109, the queue producer 116 creates a corresponding entry for the queue in the selected queue table 107 of the selected database 105, for example, by adding a new row to the selected queue table 107 that includes the tenant identifier(s) and the priority identifier for the queue along with values for the remaining columns of the row corresponding to the remaining fields of that instance of received metadata.

As described above, in some embodiments, the received metadata may include, for each entry, one or more pointers to other tables or locations of the database 105 where data relevant to the queued task can be located. For example, when the database 105 includes one or more auxiliary data tables 140 for storing or otherwise maintaining data relevant to performing a queued task, in lieu of providing data values for one or more fields of metadata for an entry to be added to the selected queue table 107, the application server 108 and/or the message generator 109 may provide one or more pointers corresponding to locations in the database 105 where those data values can be retrieved from. In such embodiments, the queue producer 116 writes the pointer or address in the auxiliary data table 140 that corresponds to a data value associated with a queued task to the column (or field) of the queue entry where that data value would otherwise belong.

Figure 4:
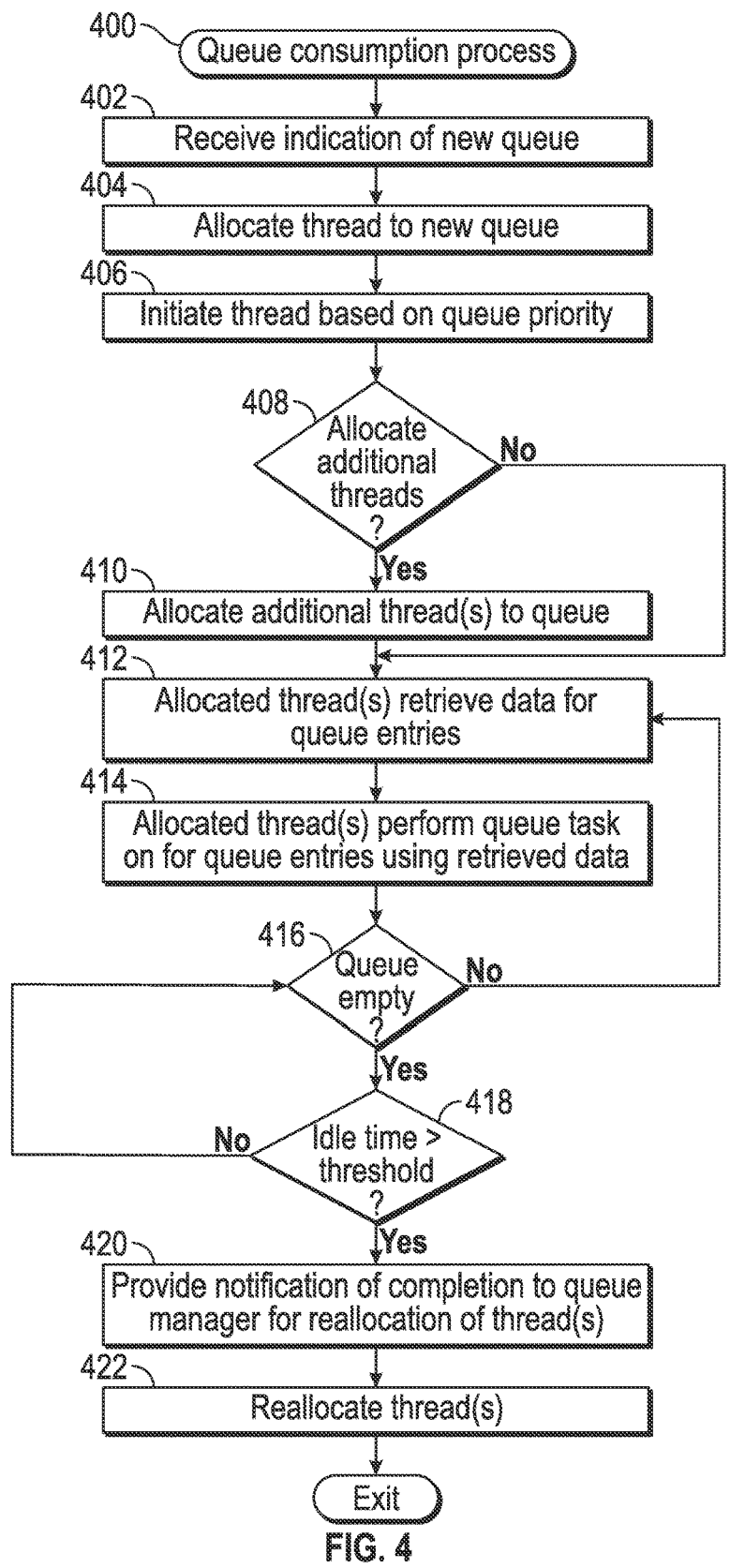
FIG. 4 is a flow diagram of an exemplary queue consumption process suitable for implementation by the on-demand database system of FIG. 1 in accordance with one or more embodiments.

FIG. 4 depicts an exemplary embodiment of a queue consumption process 400 suitable for implementation by a queue management server to perform tasks corresponding to the queue entries stored in a database in an on-demand database system. For illustrative purposes, the following description may refer to elements mentioned above in connection with FIG. 1. In practice, portions of the queue consumption process 400 may be performed by different elements of the on-demand database system 100, such as, for example, the queue management server 102, the database 104, the processing system 112, the queue consumer 120, and/or the queue manager 118. It should be appreciated that the queue consumption process 400 may include any number of additional or alternative tasks, the tasks need not be performed in the illustrated order and/or the tasks may be performed concurrently, and/or the queue consumption process 400 may be incorporated into a more comprehensive procedure or process having additional functionality not described in detail herein. Moreover, one or more of the tasks shown and described in the context of FIG. 4 could be omitted from a practical embodiment of the queue consumption process 400 as long as the intended overall functionality remains intact.

Referring to FIG. 4 with continued reference to FIG. 1, the illustrated queue consumption process 400 begins by receiving an indication of a new queue for processing within the on-demand system, and in response, assigns or otherwise allocates a thread to the new queue and automatically initiates execution of that thread at a particular point in time based on the priority associated with the new queue (tasks 402, 404, 406). As used herein, a thread should be understood as referring to set of programming instructions that are dynamically created in a data storage element accessible to the processing system 112 (e.g., in memory 114) at run-time based on the queue information, which are subsequently loaded or fetched and then executed by the processing system 112 or a component thereof (e.g., a processing core, a central processing unit, or the like). In a distributed on-demand system 100 that includes a plurality of application servers (e.g., a server farm), each thread effectively represents an allocation of server resources in the application server farm, with each thread being run on one hosting server 102 and assigned its work and its specific queue consumer class by the queue manager 118 based on the queue configuration information associated with the active queues. An allocated thread then executes queue-specific setup code (e.g., as identified in region 350 of the GUI display 300) before retrieving and processing queue entries in accordance with the queue processing configuration information.

As described above, the queue manager 118 receives indication of the destination database 105, the destination queue table 107, and the queue processing configuration information for a new queue, and in response, interacts with the queue consumer 120 to allocate a thread 122 of the queue consumer 120 to processing entries associated with that queue. In this regard, the thread 122 is allocated to the queue by configuring the thread 122 to retrieve entries associated with a unique identifier assigned to the queue, and thread is configured to access the destination queue table 107 of the destination database 105 in accordance with the queue processing configuration information. The various values or parameters of the instructions of the allocated thread 122 are set to the corresponding values or parameters of queue information received from the queue manager 118. For example, a databaseID variable for the thread 122 may be set to the unique identifier associated with the selected destination database 105, a queuetableID variable for the thread 122 may be set to the unique identifier associated with the selected queue table 107 of the destination database 105, a priority variable for the thread 122 may be set to the received priority value, and so on.

Based on the value for the priority variable, the thread 122 is scheduled by the queue manager 118 to be instantiated and thereby executed by the processing system 112 at a particular duration of time after creation. For example, when the priority variable of the thread 122 is set to indicate a high priority, setup code for the thread 122 may be scheduled to be fetched and loaded by the processing system 112 as soon as possible (e.g., the next potential processor clock cycle where it can be scheduled). Conversely, when the priority variable of the thread 122 is set to indicate a normal priority, the thread 122 may be scheduled to be fetched and loaded by the processing system 112 after any active high priority threads that are currently in the schedule. When the priority variable of the thread 122 is set to indicate a low priority, the thread 122 may be scheduled to be fetched and loaded by the processing system 112 after any active high or normal priority threads that are currently in the schedule. In one or more embodiments, each priority level is associated with a maximum delay for initiation, such that any allocated thread is guaranteed to be initiated within a certain amount of time after creation. For example, the high priority may be associated with a 1 minute maximum delay period so that any high priority threads are scheduled for execution when 1 minutes have elapsed since their allocation, the normal priority may be associated with a 5 minute maximum delay period so that any normal priority threads are scheduled for execution when 5 minutes have elapsed since their allocation, and the low priority may be associated with a 10 minute maximum delay period so that any low priority threads are scheduled for execution when 10 minutes have elapsed since their allocation. In this manner, allocated threads are automatically initiated at a particular point in time that is influenced by their associated priority.

Still referring to FIG. 4, in exemplary embodiments, the queue consumption process 400 dynamically determines whether to allocate additional threads to the queue at runtime when the allocated thread is initiated, and if so, automatically allocates a determined number of additional threads to the queue (tasks 408, 410). In this regard, at the priority dictated start time for the initially allocated thread, the queue manager 118 and/or the queue consumer 120 may access the database 105 to identify or otherwise determine the current number of entries associated with that queue (e.g., the number of entries in the queue table 107 having a queue identifier matching the queue identifier assigned to the thread 122). Based on the current number of entries in the database 105 associated with the queue (e.g., the depth of the queue), the priority associated with the queue, and one or more other factors (e.g., the remaining number of available threads associated with the queue consumer 120), the queue manager 118 and/or the queue consumer 120 determines whether any additional threads should be allocated to the queue. For example, if the number of entries associated with the queue is greater than a threshold number (which could be a factor of the maximum batch size for the queue), the queue manager 118 and/or the queue consumer 120 may then determine whether additional threads should be allocated based on the queue's priority and the number of available threads. In this regard, for a high priority queue, the queue manager 118 and/or the queue consumer 120 may determine an additional thread should be allocated as long as one or more available threads exist, while for a normal or low priority queue, the queue manager 118 and/or the queue consumer 120 may determine an additional thread should be allocated only if the number of available threads is greater than a threshold number to prevent excessive allocation of computing resources to lower priority queues.

After determining an additional thread should be allocated, the queue manager 118 and/or the queue consumer 120 may then determine the number of additional threads to be allocated based on the depth of the queue. For example, the number of threads may be determined based on the ratio of the current number of queue entries to the maximum batch size for the queue. For example, if the ratio of the current number of queue entries to the maximum batch size for the queue is greater than a first threshold value but less than a second threshold value, only a single additional thread may be allocated to the queue, while if the ratio of the current number of queue entries to the maximum batch size for the queue is greater than the second threshold value but less than a third threshold value, two additional threads may be allocated to the queue, and so on. In some embodiments, the threshold values utilized to determine the number of additional threads may also be determined based on the priority associated with the queue. For example, higher threshold values may be applied for lower priority queues and vice versa to prevent excessive allocation of computing resources to lower priority queues. After the number of additional queues to be allocated are determined, an additional thread 124 of the queue consumer 120 is allocated to processing entries associated with that queue in a similar manner as described above (e.g., by associating the additional thread 124 with the QUEUE 1 queue identifier, assigning variables of the thread 124 to the selected queue table 107, the selected database 105, and the received queue processing configuration information for QUEUE 1).

The queue consumption process 400 continues with the allocated thread(s) accessing the selected queue table of the selected database associated with the queue to retrieve data corresponding to entries associated with the queue and performs the queued task with respect to those entries of the queue using the retrieved data associated with those queue entries (tasks 412, 414). In this regard, an allocated thread retrieves a number of rows (or sets) of data from queue table 107 in the database 105 specified by the queue processing configuration information (e.g., a maximum batch size or other user-specified batch size, or a default batch size) that has a queue identifier column value equal to the queue identifier associated with the thread and one or more status identifier column values indicating that those rows (or entries) have not been processed or retrieved by another thread. For example, one column of the queue table 107 may be configured to include an identifier associated with the server 102 that has claimed a particular row (or queue entry) of the queue table 107 along with a second column that indicates the current status of the queue entry, with those values being written or otherwise populated by the queue consumer 120 as appropriate at run-time. For each retrieved row or set of retrieved data, the allocated thread performs the task associated with the queue using the data associated with that row (or a subset thereof) and provides a result of the queued task on that queue entry to the intended destination for the queue. After performing the queued task on retrieved rows of data, the allocated thread modifies or otherwise updates those rows of data in the queue table 107 to indicate that they have been completed or otherwise performed.

For example, THREAD 1 associated with QUEUE 1 may query the database 105 to retrieve, from the queue table 107, a number of rows of data equal to the maximum batch size associated with QUEUE 1 that have a queue identifier column value corresponding to QUEUE 1 and a status identifier column value indicating that those rows (or entries) have not been processed. For each row of data, THREAD 1 may retrieve or otherwise obtain additional data from the auxiliary table 140 referenced by one or more columns of the row, performs the task associated with the queue using that data, and provides a result to the application server 108 and/or the message generator 109 associated with the queue. After performing the queued task on retrieved rows of data, THREAD 1 updates those corresponding entries associated with QUEUE 1 in the queue table 107 to indicate that the queued task has been performed on those entries. In parallel to THREAD 1 performing the queued task on a first set of entries associated with QUEUE 1, an additional THREAD 2 associated with QUEUE 1 may query the database 105 to retrieve, from the queue table 107, the maximum batch size number of rows of data associated with QUEUE 1 that have not already been retrieved or processed by THREAD 1, retrieve or otherwise obtain additional data from the auxiliary table 140 corresponding to those entries, and perform the task associated with QUEUE 1 on those entries and providing the result to the application server 108 and/or the message generator 109. Additionally, if the queue processing configuration information allows for prefetching queue entries, background threads (not illustrated) associated with the allocated threads 122, 124 may attempt to retrieve the maximum batch size number of entries for the queue from the database 105 for processing by the parent threads 122, 124 upon completion of their current batch. This can greatly improve throughput by allowing the queue consumer 120 to concurrently fetch the next batch of queue entries while a task specific consumer thread is processing a current batch of queue entries rather than having to wait for a batch of queue entries to be claimed and fetched between processing each batch.

The queue consumption process 400 identifies or otherwise determines whether the queue is empty (task 416), and as long as the queue is not empty and unprocessed entries associated with the queue are maintained in the database, the loop defined by tasks 412, 414, and 416 repeats until there are no longer any queue entries available for retrieval by an allocated thread. In response to determining the queue is empty, the queue consumption process 400 monitors the amount of idle time associated with the thread, and in response to determining the idle time exceeds a threshold, the queue consumption process 400 generates or otherwise provides a notification of completion of the queue entries and releases the thread for reallocation to a different queue (tasks 418, 420, 422). For example, in response to a failure to retrieve any rows of data upon querying the database 105, an allocated thread may initiate a timer or similar feature to track the amount of time that the thread has been idle, and periodically attempt to retrieve additional queue entries until the idle time is greater than or equal to the maximum idle time timeout period associated with the queue. In this regard, the allocated threads 122, 124 may query the database 105 on a regular basis until their associated idle times exceeds the maximum allowable duration of time specified by the queue processing configuration information for that queue. For example, THREAD 1 may query the database 105 every 5 seconds for entries associated with QUEUE 1 until its idle timer value is greater than 40 seconds (e.g., the maximum idle time associated with QUEUE 1). In this manner, an allocated thread is held for an active queue for a period of time to reduce the overhead associated with reinitializing or reallocating the thread to the same queue if new entries for that queue are generated after the thread is released from the queue.

When the idle time for a thread exceeds the maximum idle time threshold, the allocated thread 122, 124 may generate or otherwise provide a notification to the queue manager 118 that processing of the existing queue entries for a particular queue has been completed. In response, the queue manager 118 may release the threads 122, 124 by terminating any associated background threads and resetting or otherwise clearing the variable or parameter values associated with the threads 122, 124. Additionally, the queue manager 118 may remove the entries associated with the queue from the queue table 107 for deletion or archival (e.g., in another table of the database 105), as desired. In embodiments where additional queues are active, the queue manager 118 may determine whether to reallocate the threads 122, 124 to a different queue and then reallocate those threads in a similar manner as described above (e.g., tasks 408, 410). For example, the entries associated with QUEUE 1 have been processed, the queue manager 118 may reallocate THREAD 1 or THREAD 2 to process QUEUE 2 in parallel with THREAD 3 by setting a queueID variable for the thread 122, 124 to the unique identifier corresponding to QUEUE 2, and setting the remaining queue processing configuration parameters of the thread 122, 124 to the corresponding queue processing configuration information received for QUEUE 2.

Figure 5:
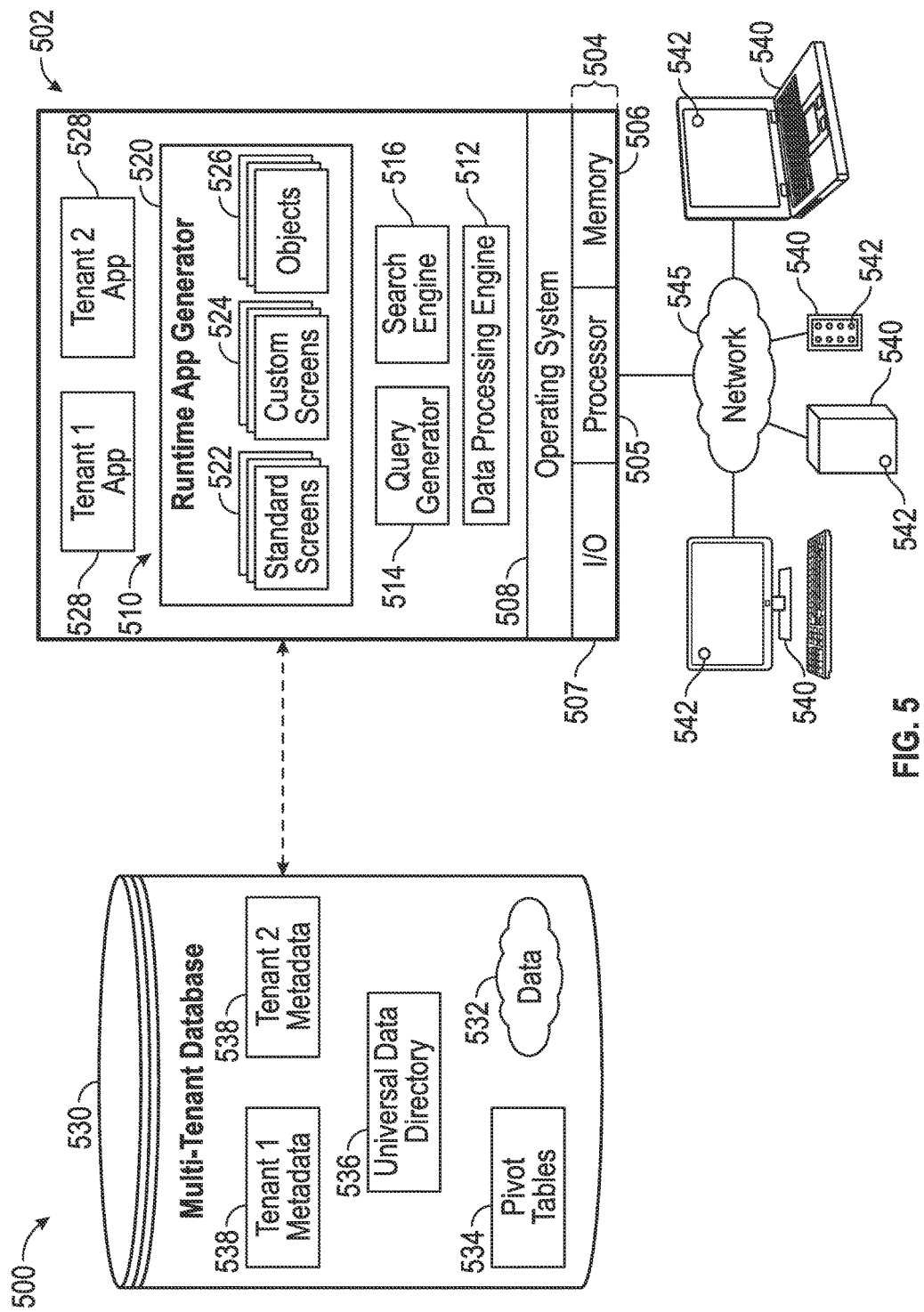
FIG. 5 is a block diagram of an exemplary multi-tenant system suitable for use in the on-demand database system of FIG. 1 in accordance with one or more embodiments.

FIG. 5 depicts an exemplary embodiment of a multi-tenant system 500 suitable for use with the on-demand database system 100 of FIG. 1. The illustrated multi-tenant system 500 of FIG. 5 includes a server 502 (e.g., queue management server 102 and/or application server 108) that dynamically creates and supports virtual applications 528 based upon data 532 from a common database(s) 530 (e.g., one or more of databases 104) that is shared between multiple tenants, alternatively referred to herein as a multi-tenant database. Data and services generated by the virtual applications 528 are provided via a network 545 (e.g., network 101) to any number of client devices 540 (e.g., client device 110, or the like), as desired. Each virtual application 528 is suitably generated at run-time (or on-demand) using a common application platform 510 that securely provides access to the data 532 in the database 530 for each of the various tenants subscribing to the multi-tenant system 500.

In accordance with one non-limiting example, the multi-tenant system 500 is implemented in the form of an on-demand multi-tenant customer relationship management (CRM) system that can support any number of authenticated users of multiple tenants. For example, a CRM application platform may implement a triggered send mechanism and act as a message generator (e.g., message generator 109) that calls a corresponding API (e.g., queue producer 116) that places send requests on a queue that is then processed by a queue consumer on one or more instances of the server 502 within the multi-tenant system 500. As another example, a user of a CRM application can create or define an e-mail send, which, in turn, calls a messaging API (e.g., queue producer 116), which in turn, may call one or more CRM APIs to obtain the appropriate contacts or leads associated with that user (or that user's tenant) and generate corresponding queue entries corresponding to the e-mails to be sent, which, in turn, are processed by a queue consumer on one or more instances of the server 502 within the multi-tenant system 500 to construct the e-mail messages, which in turn, are then distributed by the CRM application platform to the desired intended recipients via the network 545.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500 (i.e., in the multi-tenant database 530). For example, the application server 502 may be associated with one or more tenants supported by the multi-tenant system 500. Although multiple tenants may share access to the server 502 and the database 530, the particular data and services provided from the server 502 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 526 such as "account" objects, "opportunity" objects, "contact" objects, or the like. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of performing queues in a database system, the database system including a queue management server coupled to a plurality of different databases, each database of the plurality of different databases being associated with a different database type and each database including a plurality of queue tables, each queue table of the plurality of queue tables being associated with a different queue type and each queue table having different schema, the method comprising:
   receiving from a user of another computer device, by the queue management server via a network, configuration information for a first queue, the configuration information identifying a first queue type as selected by the user, the first queue type corresponding to a first queue table of the plurality of queue tables, and the configuration information identifying a database type as selected by the user;
   receiving, by the queue management server via the network, work detail data metadata for a plurality of entries associated with the first queue, where the work detail metadata defines the individual tasks to be performed by the plurality of entries associated with the first queue;
   writing, by the queue management server, the work detail metadata for the plurality of entries to the first queue table in the database based on the first queue type identified by the configuration information indicating the database and database type and first schema associated with the first queue table, where the first schema is designed for a particular type of database transaction and identifies appropriate fields of work detail metadata for the first queue table corresponding to the type of database transaction;
   allocating, by the queue management server, one or more threads of a processing system of the queue management server to the first queue in response to writing the work detail metadata to the database;
   retrieving, by a first thread of the one or more threads of the processing system of the queue management server, work detail metadata for a respective subset of entries of the first queue of entries from the first queue table based on the configuration data associated with the respective subset of entries as determined by the first schema associated with the first queue;
   automatically reallocating the first thread when an idle time associated with the first thread is greater than an idle timeout criterion indicated by the configuration information; and
   performing, by the first thread, a task corresponding to the first queue type using the work detail metadata for the respective subset of entries.

2. The method of claim 1, wherein performing the task comprises generating result data for the respective subset of entries based on the work detail metadata and providing the result data to a destination device on the network.

3. The method of claim 1, further comprising retrieving, by the first thread from the database, auxiliary data corresponding to the respective subset of entries based on the work detail metadata, wherein performing the task comprises performing the task corresponding to the first queue type on the auxiliary data.

4. The method of claim 1, further comprising automatically instantiating the first thread based on a priority criterion indicated by the configuration information.

5. The method of claim 1, further comprising:
   determining a number of the one or more threads to be allocated based at least in part on a number of entries of the plurality of entries.

6. A system comprising:
   a plurality of databases, each database of the plurality having a different database type and each database of the plurality including a plurality of queue tables, each table of the plurality of queue tables having a different queue type and a different schema associated therewith; and
   a queue management server coupled to the plurality of databases and a network to:
      receive, via the network, configuration information for a first queue, the configuration information identifying a first database type corresponding to a first database of the plurality of databases and a first queue type as selected by the user, the first queue type corresponding to a first queue table of the plurality of queue tables, and the configuration information identifying a database type as selected by the user;
      receive, via the network, work detail metadata for a plurality of entries associated with the first queue, where the work detail metadata defines the individual tasks to be performed by each of the entries associated with the first queue;
      write the work detail metadata for the plurality of entries to the first queue table in the first database based on the configuration information indicating the database and database type in accordance with a first schema associated with the first queue table, where the first schema is designed for a particular type of database transaction and identifies appropriate fields of work detail metadata for the first queue table corresponding to the type of database transaction;
      automatically allocate one or more threads of a processing system of the queue management server to the first queue in response to writing the work detail metadata to the first database, wherein a first thread of the one or more threads is configured to retrieve a subset of the work detail metadata for a respective subset of entries of the first queue of entries from the first queue table in a manner based on the configuration data associated with the respective subset of entries as determined by the first schema associated with the first queue table, automatically reallocate the first thread when an idle time associated with the first thread is greater than an idle timeout criterion indicated by the configuration information, and perform a task corresponding to the first queue type using the subset of the work detail metadata corresponding to the respective subset of entries.

7. The system of claim 6, wherein the queue management server provides, to a destination device on the network, result data corresponding to performance of the task using the subset of the work detail metadata corresponding to the respective subset of entries.

8. The system of claim 6, wherein:
the configuration information includes a priority criterion; and
the first thread is automatically initiated at a point in time after writing the work detail metadata that is influenced by the priority criterion.

\* \* \* \* \*